US010987200B2

(12) United States Patent
Fischler et al.

(10) Patent No.: US 10,987,200 B2
(45) Date of Patent: Apr. 27, 2021

(54) CEMENTING A DENTAL RESTORATION TO A BASE

(71) Applicant: VALOC AG, Rheinfelden (CH)

(72) Inventors: Titus Fischler, Zeiningen (CH); Felix Fischler, Basel (CH)

(73) Assignee: VALOC AG, Rheinfelden (CH)

( * ) Notice: Subject to any disclaimer, the term of this patent is extended or adjusted under 35 U.S.C. 154(b) by 0 days.

(21) Appl. No.: 16/093,574

(22) PCT Filed: Mar. 21, 2017

(86) PCT No.: PCT/EP2017/056645
§ 371 (c)(1),
(2) Date: Oct. 12, 2018

(87) PCT Pub. No.: WO2017/178197
PCT Pub. Date: Oct. 19, 2017

(65) Prior Publication Data
US 2019/0282339 A1 Sep. 19, 2019

(30) Foreign Application Priority Data
Apr. 14, 2016 (EP) ..................................... 16165361

(51) Int. Cl.
A61C 8/00 (2006.01)
A61C 5/64 (2017.01)
(Continued)

(52) U.S. Cl.
CPC .............. A61C 8/0048 (2013.01); A61C 5/62 (2017.02); A61C 5/64 (2017.02); A61C 5/70 (2017.02)

(58) Field of Classification Search
CPC ... A61C 8/0048; A61C 8/0089; A61C 8/0028; A61C 5/64; A61C 5/02; A61C 5/08;
(Continued)

(56) References Cited

U.S. PATENT DOCUMENTS 5,695,339 A * 12/1997 Abere ................ A61C 13/0003
433/218
9,352,352 B2 * 5/2016 Wu ........................... B05C 7/00

FOREIGN PATENT DOCUMENTS

EP 1 707 229 A1 10/2006
EP 1707229 A1 * 10/2006 ........... B21C 37/157

OTHER PUBLICATIONS

International Search Report and Written Opinion dated Jun. 26, 2017 in corresponding International Patent Application No. PCT/EP2017/056645.

* cited by examiner

Primary Examiner — Ralph A Lewis
Assistant Examiner — Mirayda A Aponte
(74) Attorney, Agent, or Firm — Medler Ferro Woodhouse & Mills PLLC

(57) ABSTRACT

A dental restoration cementing device for cementing a dental restoration is disclosed having a closable axial passage to a base having a hollow interior which is open into an occlusal direction. The device includes a preferably elastic body portion dimensioned to tightly fit into the hollow interior of the base via the passage of the dental restoration. The device further includes a hollow cementing portion extending from the body portion. The cementing portion has a lateral opening which is located outside the base when the body portion is fitted into the hollow interior of the base such that a pathway is formed from the interior of the cementing portion through the lateral opening into a gap between the dental restoration and the base. The dental restoration cementing device allows for precisely, quickly and cost efficiently cementing the dental restoration to the base.

14 Claims, 4 Drawing Sheets

(51) Int. Cl.
*A61C 5/62* (2017.01)
*A61C 5/70* (2017.01)

(58) Field of Classification Search
CPC ......... A61C 5/06; A61C 3/00; A61C 13/0001;
A61C 13/225; A61C 5/00; A61C 5/35;
A61C 5/30; A61C 8/0068; A61C 8/0054;
A61C 8/0022; A61M 5/32; B21G 1/08
USPC ..................... 433/202.1; 222/137, 145, 326
See application file for complete search history.

CEMENTING A DENTAL RESTORATION TO A BASE

TECHNICAL FIELD

The present invention relates to a dental restoration cementing device according to the preamble of independent claim 1 and more particularly to a dental restoration cementing assembly and a method of cementing a dental restoration to a base.

Typically, dental restorations have a closable axial passage and bases have hollow interiors open into an occlusal direction. Such cementing devices comprise an elastic body portion dimensioned to tightly fit into the hollow interior of the base via the passage of the dental restoration for sealing the interior of the base. With the sealed interior the base can be cemented to the dental restoration.

BACKGROUND ART

For dental restoration, often damaged or lost teeth are replaced by artificial teeth which comprise dental restorations such as bridges, crowns or the like. Thereby, the dental restorations are placed either on remainders of original teeth or on implants set as artificial roots into jaw bones. Known restorations usually are made of materials which meet specific requirements such as biocompatibility, robustness, longevity and the like. For example, in non-exposed sections of the mouth metal dental restorations, e.g. made of gold or zirconium, are often used. In sections of the mouth which are visible, usually other materials are preferred which optically better suit to the appearance of natural teeth. For example, ceramic materials, composite materials, fiber-reinforced composites or acrylic glasses (Polymethylmethacrylate—PMMA) are commonly used.

As mentioned, the materials of crows are typically chosen in consideration of the requirements for being used as teeth such aesthetic requirements, mechanical conditions and the like. However, for being directly placed on implants which are typically made of titanium or on remainders of original teeth these materials are often not suitable. Therefore, usually an intermediate structure is provided between the dental restoration and the implant or remainder. Widespread intermediate structures are bases which are cemented to the crowns. For example, for being connected to titanium implants often crowns are cemented to titanium bases which are then placed on and connected to the implant.

Typically, restorations are cemented on bases outside the mouth by a dental technician or dentist. Thereby, specific adhesives are used as cements wherein many cements are mixed of plural components before being applied. The cemented bases and restorations are then connected to the implants or remainders in the mouth wherein the bases contact the implants or remainders. Often, the dental restoration together with the base is fixed to the implant by means of a screw axially projecting through the dental restoration and the base into the implant.

For cementing a dental restoration on a base, often a model is used. For that purpose, at least a portion of the mouth in which an implant is set for mounting the dental restoration is modelled by a dental technician or a dentist using known modelling techniques. However, even though such model based cementing allows for precisely cementing the restoration to the base and for providing sophisticated cemented restoration-base-structures it is comparably cumbersome. For example, such techniques require the models to be generated. For that purpose, patients have to separately see the dental technician or dentist after setting the implant. Thereafter, the dental technician or dentist builds the model and cements the crown to the base. Then, the cemented crown and base are mounted to the implant in a separate step. Thus, such cementing is comparably time consuming, causes a comparably large effort and is comparably expensive.

For making the cementing process faster and cheaper many dentists do manually cement the dental restoration to the base. Thereby, often the base which typically has a hollow interior is closed by an elastic plug such that no cement can enter the interior of the base. The elastic plug typically is adapted to the geometry of the base in order to allow a safe closing. However, considering that dental restorations and particularly bases usually are comparably small such manual cementing often provides results of reduced quality. For, example often the cement is not regularly or uniformly distributed between the crown and the base such that the connection is not consistently strong. Also, often the crown can manually not be precisely positioned or oriented such that a reduced comfort and a reduced usability may result.

Therefore, there is a need for a system or device allowing for a precise, fast and cost efficient cementing of a dental restoration to a base.

DISCLOSURE OF THE INVENTION

According to the invention this need is settled by a dental restoration cementing device as it is defined by the features of independent claim 1, by a dental restoration cementing assembly as it is defined by the features of independent claim 14, and by a method of cementing a dental restoration to a base as it is defined by the features of independent claim 15. Preferred embodiments are subject of the dependent claims.

In particular, the invention deals with a dental restoration cementing device for cementing a dental restoration having a closable axial passage to a base having a hollow interior which is open into an occlusal direction. The dental restoration cementing device comprises a preferably elastic body portion dimensioned to tightly fit into the hollow interior of the base via the passage of the restoration. It further comprises a hollow cementing portion extending from the body portion. The cementing portion has a lateral opening which is located outside the base when the body portion is fitted into the hollow interior of the base such that a pathway is formed from the interior of the cementing portion through the lateral opening into a gap between the restoration and the base.

The term "dental restoration" as used herein can relate to the outermost structure of an artificial tooth. It can particularly be a crown or a bridge or the like. Within dental restoration it can cap or encircle a dental implant and form the visible portion of the artificial tooth and its chewing face. Advantageously, it has the shape of the tooth to be replaced by the restoration. Typically restorations such as crowns are made of a metal, a metal ceramic, a ceramic, zirconium, zirconium dioxide, polymethylmethacrylate (PMMA), a composite, a fiber-reinforced composite or another material having color and properties similar to natural teeth.

The term "axial" as used herein relates to an axis of the device or assembly. This axis can particularly correspond to an axis of the tooth to be replaced or fixed. When being applied in the mouth, the axial passage, thus, can extend from an occlusal surface of the restoration to the implant. Thereby, the passage can be closable in order to have a proper surface when being mounted to the implant. For example, a suitable plug can be pressed into the passage after the restoration is mounted to the implant.

The term "base" as used herein can relate to a substructure or intermediate structure to be integrated in the restoration for being mounted to an implant or abutment. In particular, the base can be a structure made of a metal such as titanium which forms a connector to the implant. It can be adapted to extend into the passage of the restoration. Thereby, it can align and hold the restoration. The base can particularly be cup shaped or sleeve shaped having a cylindrical or conical section and an implant face section. In this connection the term "axial end" can relate to an end of the body portion facing into a direction of an implant in an intended application of the dental restoration. It can be the end in an apical direction.

The base can have a hollow interior in order that a mounting element such as a screw can be provided through the base and the restoration for fixing the base to an implant. In particular, the hollow interior can be adapted to receive a head of a screw which fixes the base and the restoration to the implant. Thereby, the base can have an opening which is dimensioned to allow the post of the screw to pass but not the head.

The term "tightly fit" in connection with the body portion can relate to the ability to suit or to close the interior of the base. In particular, the body portion can tightly close the interior of the base for the liquid cement such that it can be prevented that cement enters the interior of the base or that the cement travels through the interior of the base. Rather, the cement or the major portion thereof can be provided around the base where it lies inside the passage of the dental restoration.

For tightly fitting into the interior of the base the body portion can be conical. Such a conical shape allows the dental restoration cementing device to be use with plural differing geometries of bases. In particularly, bases of different diameters can be closed by the same body portion. Alternatively, for the same purpose, the body portion can be equipped with a circumferential protrusion or a bulge dimensioned to seal the interior of the base. Furthermore, the material of the body portion can have an elasticity sufficient to tightly abut the occlusal end of the body when being pushed into its interior.

The term "occlusal direction" as used in connection with the hollow interior of the base can relate to a direction essentially towards a biting surface of the artificial tooth in an intended application of the base and restoration. Thereby the artificial tooth can particularly comprise the restoration and the base. The body portion can be shape to only fit into the interior of the base near its occlusal end. Or it can advantageously be dimensioned to axially extend through more or less the whole base such that it extends from the occlusal end of the base to its apical end. Generally, the term "occlusal" as used herein can relate to a direction towards the biting surface of the artificial tooth or the dental restoration in its intended application. Correspondingly, the term "apical" can relate to a direction towards a root of the tooth which is intended to be replaced or fixed. Occlusal and apical directions can be opposite.

The term "lateral" as used in connection with the opening of the cementing portion can relate to a direction essentially perpendicular to an occlusal direction, apical direction or axial direction. Particularly, the opening can be provided in a side wall of the hollow cementing portion. Axially, the lateral opening can be located outside the base at or near an occlusal end of the base. Thereby, the tem "occlusal end" can relate to the end of the base in the occlusal direction. Alternatively, the lateral opening can be located inside the interior of the base between the occlusal end thereof and a protrusion or bulge sealing the interior of the base. Also, the lateral opening can extend from outside to inside the base.

In use of the dental restoration cementing device, the body portion can be arranged through the passage of the dental restoration into the interior of the base. Thereby, the body portion is advanced until it tightly fits into the interior of the base and closes the latter. Then a cement is pushed into the hollow cementing portion such that it is pressed though the lateral opening and is provided in between the base and the dental restoration. Since the interior of the base is tightly closed by the body portion of the dental restoration cementing device it is prevented that any cement enters the base or that cement travels through the interior of the base. This allows for conveniently force the cement in the complete gap between the base such that, after being cured, the cement uniformly and evenly adheres the dental restoration to the base. Furthermore, this allows for providing a clean working space and for reducing any remains of cement. If any cement is positioned inside the base it is removed when withdrawing the device. Thus, the dental restoration cementing device allows for precisely, quickly and cost efficiently cementing the dental restoration to the base.

Preferably, the body portion and the cementing portion are one piece or integrally made of the same material. Advantageously, the material is elastic to an appropriate extent and does not chemically interact with the cement. It can particularly be a plastic material such as a polyoxymethylene (POM). Such a material allows for providing an appropriate elasticity and inertness with respect to typical cements. Also, such a material can make an efficient manufacture of the dental restoration cementing device possible.

Preferably, the lateral opening comprises a plurality of through holes or slits. Such a plurality of through holes or slits allows for providing cement around the cementing portion such that a uniform distribution of the cement around the base is conveniently possible. Thereby, the slits and through holes can have a diameter in the range of about 0.2 millimeter (mm) to about 0.5 mm or particularly of about 0.3 mm.

The body portion can be dimensioned to being arranged in the opening of the base at its occlusal end. However, the body portion preferably comprises a support section which can be reversely oriented in relation to a proximal end. The support section can be used for abutting against a bottom or distal end of the base. The term "proximal" in connection with the dental restoration cementing device or specific portions thereof can relate to a direction opposite to the direction into which the dental restoration cementing device is advanced for closing the interior of the base. Correspondingly, the term "distal" can relate to a direction opposite to the proximal direction.

Furthermore, the body portion preferably comprises an axial end with an analogue connection post. Such an analogue connection post can project into an implant analogue via a through bore in the base when the base arranged on the analogue. Like this the dental restoration and the base can conveniently be mounted to the analogue while being cemented together.

In a preferred embodiment, the analogue connection post has a thread on its outer surface. Such a thread allows the body portion to be screwed into the implant or tooth analogue for mounting the dental restoration cementing device together with the dental restoration and the base to the analogue.

In another preferred embodiment, the analogue connection post is dimensioned to be clamped in an opening of an associated analogue. Like this, the cementing device can be mounted to the analogue by being press fitted into the opening of the analogue. In particular, the connection post can be slightly deformed when being pressed into the opening of the analogue such that it is firmly held by friction.

Preferably, the cementing portion comprises a sealing bulge around its outer circumference. Such a sealing bulge allows for tightening the cementing portion to the passage of the dental restoration. Like this, it can be prevented or reduced that cement entering between cementing section and the restoration travels out of the passage of the dental restoration. In particular, it allows for preventing the cement from being provided to another location than between the dental restoration and the base. This makes a particularly efficient cementing possible.

In a preferred embodiment, a side wall of the hollow interior of the cementing portion comprises a mixing contour. The mixing contour may allow for mixing plural components of preferably liquid cement directly inside the cementing portion. Thereby, the mixing contour preferably is essentially helical. Such helical mixing contour makes an efficient mixing of the components of the cement possible.

In another preferred embodiment, the proximal end of the cementing portion comprises an adapter section for receiving a cement mixing arrangement. The cement mixing arrangement can be a mixing cannula, a cartridge or the like.

Another aspect of the invention deals with a dental restoration cementing assembly which comprises a dental restoration with a closable axial passage, a base adapted to extend into the passage of the restoration and having a hollow interior opened into an occlusal direction, and a dental restoration cementing device as described above. Such a dental restoration cementing assembly allows for efficiently achieving the effect and benefits described above in connection with the dental restoration cementing device. Particularly, the single parts of the assembly can be adapted to each other such that an efficient interaction and application can be achieved.

Preferably, the dental restoration cementing assembly further comprises an implant analogue adapted to receive the base and to be connected to the body portion of the dental restoration cementing device, wherein the base comprises an opening in an apical end side and the body portion is connected to the implant analogue through the opening of the base when being tightly fitted into the hollow interior of the base. Such analogue can be made of the same material as the implant or any other suitable material such as a material allowing a one-way use. It allows for placing the base and restoration in a well-defined position such that they can be conveniently cemented together.

Preferably, the dental restoration cementing assembly further comprising a carrier stand onto which the implant analogue is mountable. The stand can be manufactured of a metal or a rigid plastic. Such a stand allows for safely arranging the assembly particularly during cementing. Thereby, the implant analogue preferably is adapted to be screwed onto the carrier stand. This allows for safely mounting the analogue to the stand.

A further other aspect of the invention relates to a method of cementing a dental restoration on a base. The method comprises the steps of obtaining a dental restoration having a closable axial passage and a base having a hollow interior which is open into an occlusal direction; placing the dental restoration onto the base such that the base extends into the passage of the dental restoration; tightly fitting a body portion of a dental restoration cementing device as described above into the hollow interior of the base such that a cementing portion of the dental restoration cementing device extends through the passage of the dental restoration; pushing a cement into the cementing portion of the dental restoration cementing device such that the cement is provided out of the lateral opening of the cementing portion of the dental restoration cementing device into a gap between the dental restoration and the base; and curing the cement in the gap between the dental restoration and the base. Such a method allows for efficiently cementing the dental restoration to the base. It further allows for implementing the effects and benefits described above in connection with the dental restoration cementing device.

BRIEF DESCRIPTION OF THE DRAWINGS

The dental restoration cementing device, the dental restoration cementing assembly and the method according to the invention are described in more detail hereinbelow by way of an exemplary embodiment by way of an exemplary embodiment and with reference to the attached drawings, in which.

DESCRIPTION OF EMBODIMENTS

In the following description certain terms are used for reasons of convenience and are not intended to limit the invention. The terms "right", "left", "up", "down", "under" and "above" refer to directions in the figures. The terminology comprises the explicitly mentioned terms as well as their derivations and terms with a similar meaning. Also, spatially relative terms, such as "beneath", "below", "lower", "above", "upper", "proximal", "distal", and the like, may be used to describe one element's or feature's relationship to another element or feature as illustrated in the figures. These spatially relative terms are intended to encompass different positions and orientations of the devices in use or operation in addition to the position and orientation shown in the figures. For example, if a device in the figures is turned over, elements described as "below" or "beneath" other elements or features would then be "above" or "over"

the other elements or features. Thus, the exemplary term "below" can encompass both positions and orientations of above and below. The devices may be otherwise oriented (rotated 90 degrees or at other orientations), and the spatially relative descriptors used herein interpreted accordingly. Likewise, descriptions of movement along and around various axes includes various special device positions and orientations.

To avoid repetition in the figures and the descriptions of the various aspects and illustrative embodiments, it should be understood that many features are common to many aspects and embodiments. Omission of an aspect from a description or figure does not imply that the aspect is missing from embodiments that incorporate that aspect. Instead, the aspect may have been omitted for clarity and to avoid prolix description. In this context, the following applies to the rest of this description: If, in order to clarify the drawings, a figure contains reference signs which are not explained in the directly associated part of the description, then it is referred to previous or following description sections. Further, for reason of lucidity, if in a drawing not all features of a part are provided with reference signs it is referred to other drawings showing the same part. Like numbers in two or more figures represent the same or similar elements.

Figure 1:
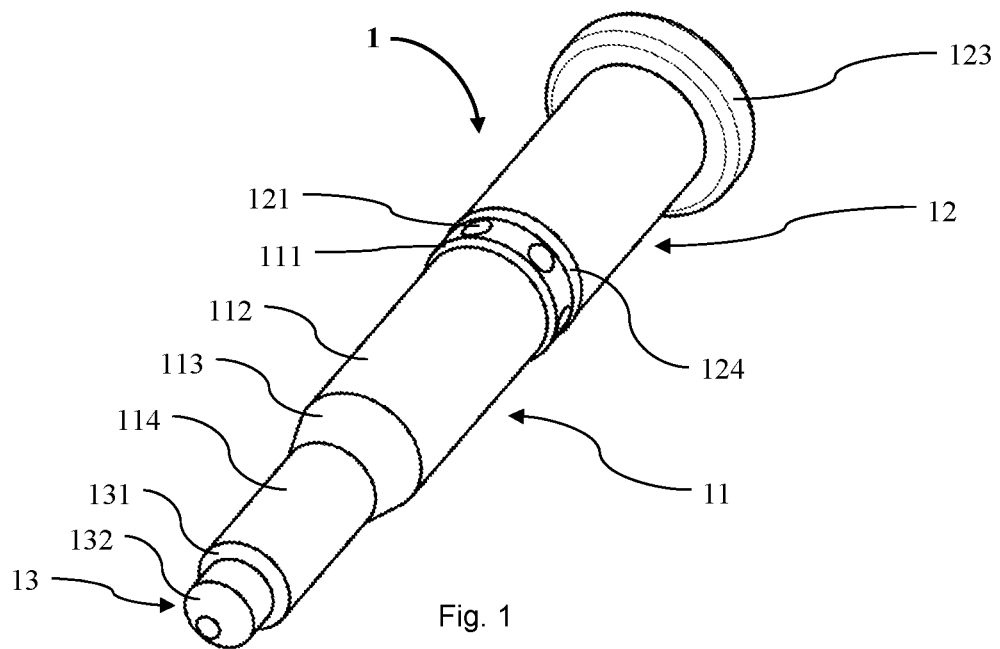
FIG. 1 shows a perspective view of a first embodiment of a dental restoration cementing device according to the invention.
Figure 2:
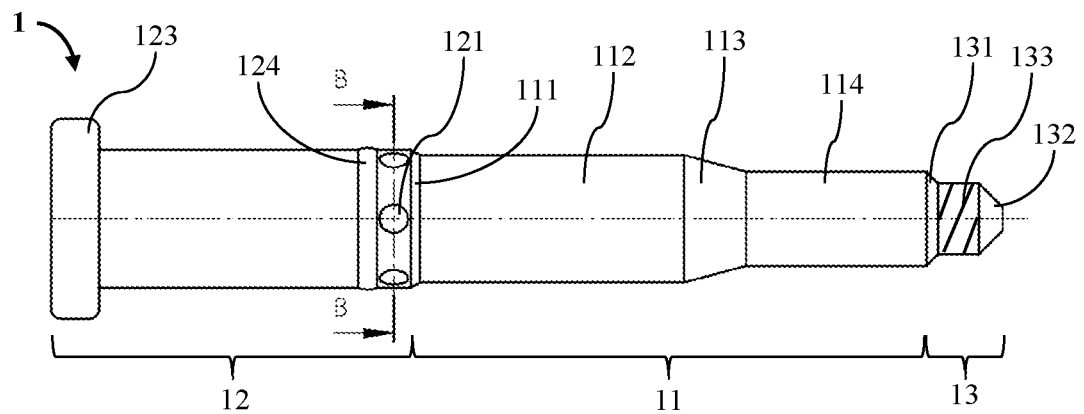
FIG. 2 shows a side view of the dental restoration cementing device of FIG. 1.

FIG. 1 and FIG. 2 show a first embodiment of a dental restoration cementing device 1 according to the invention. It comprises a plug portion 11 as body portion having a circle cylindrical proximal section 112 and a circle cylindrical distal section 114. The proximal section 112 has a larger diameter than the distal section 114. The proximal section 112 passes over into the distal section 114 via an intermediate section 113. The intermediate section 113 has a shape of a truncated cone such that it tapers into a distal or axial direction.

At its distal or axial end the plug portion 11 passes over into a post 13 of the dental restoration cementing device 1 via a shoulder section 131. The post 13 has a conical tip section 132 which tapers in the distal or axial direction and a thread 133, as shown in FIG. 2.

Figure 4:
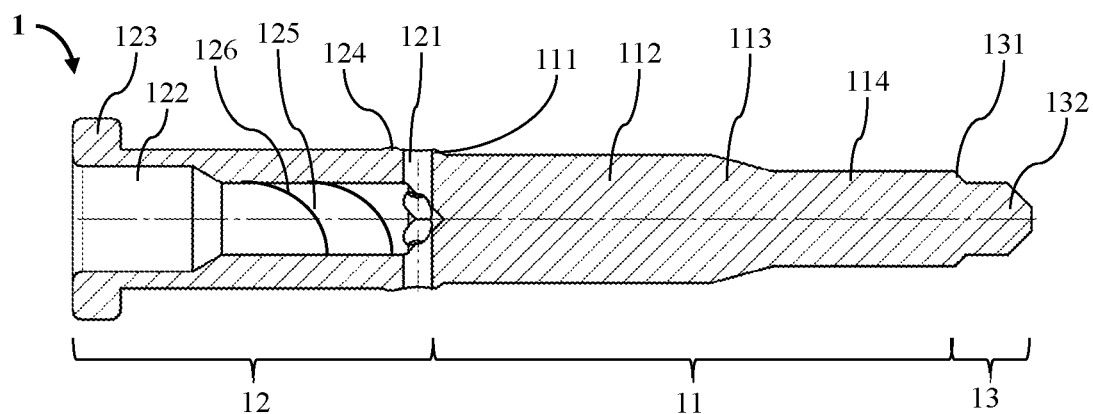
FIG. 4 shows an axial cross sectional view of the dental restoration cementing device of FIG. 1 along the line A-A of FIG. 3.

The dental restoration cementing device 1 further comprises a cylindrical hollow cementing portion 12 vertically or axially extending from an occlusal or proximal end 111 of the plug portion 11. A cylinder wall of the cementing portion 12 is provided with a mixing contour 126, as shown in FIG. 4, and a lateral opening having a plurality of regularly and circumferentially positioned holes 121. Axially, the holes 121 are arranged adjacent to the proximal end 111 of the plug portion 11. The cementing portion 12 is equipped with a circumferential sealing bulge 124 which surrounds an outer surface of the cementing portion 12. Further, the cementing portion 12 has a flange 123 at its proximal end which corresponds to the proximal end of the complete dental restoration cementing device 1. The body portion 11, the cementing portion 12 and the post 13 are integrally made of Polyoxymethylene (POM).

Figure 3:
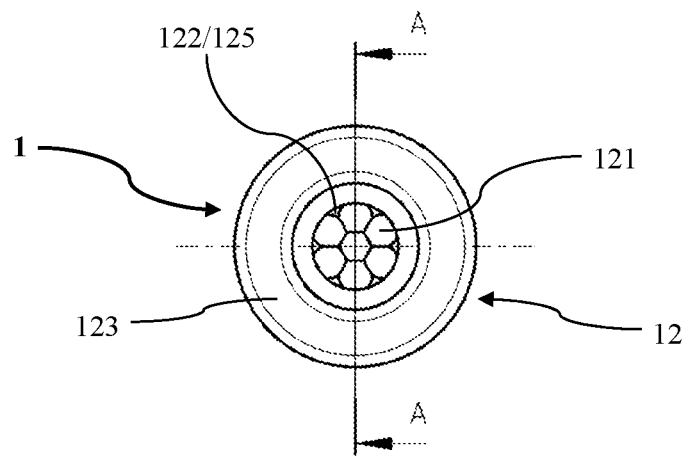
FIG. 3 shows a view on a proximal end side of the dental restoration cementing device of FIG. 1.

In FIG. 3 the dental restoration cementing device 1 is shown from its proximal end side. Thereby, it can be seen that the flange 124 of the cementing portion 12 has a ring like shape. Through a hollow interior formed by a adapter section 122 and a cement reservoir 125 the beginning of the holes 121 can be seen. In particular, there are six holes 121 regularly distributed around the cementing portion 12.

FIG. 4 shows the dental restoration cementing device 1 in an axial cross sectional view. Thereby, it can be seen that the cementing portion 12 comprises the adapter section 122 which passes over into the cement reservoir 125. The interior of the adapter section 122 and the interior of the cement reservoir 125 together form a hollow interior of the cementing portion 12. Whereas the cementing portion 12 has a hollow interior, the plug portion 11 and the post 13 are solid.

Figure 5:
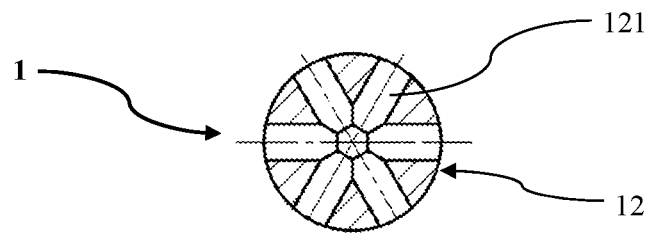
FIG. 5 shows a transversal cross sectional view of the dental restoration cementing device of FIG. 1 along the line B-B of FIG. 2.

In FIG. 5 the dental restoration cementing device 1 is shown in a transversal cross sectional view at the axial position of the holes 121. Thereby, it can be seen that each of the six holes 121 straightly extends from a center of the cementing portion 12 in a radial direction. The six holes 121 are outwardly and inwardly open such that the cement reservoir 125 is connected to the outside of the dental restoration cementing device 1 via the holes 121.

Figure 6:
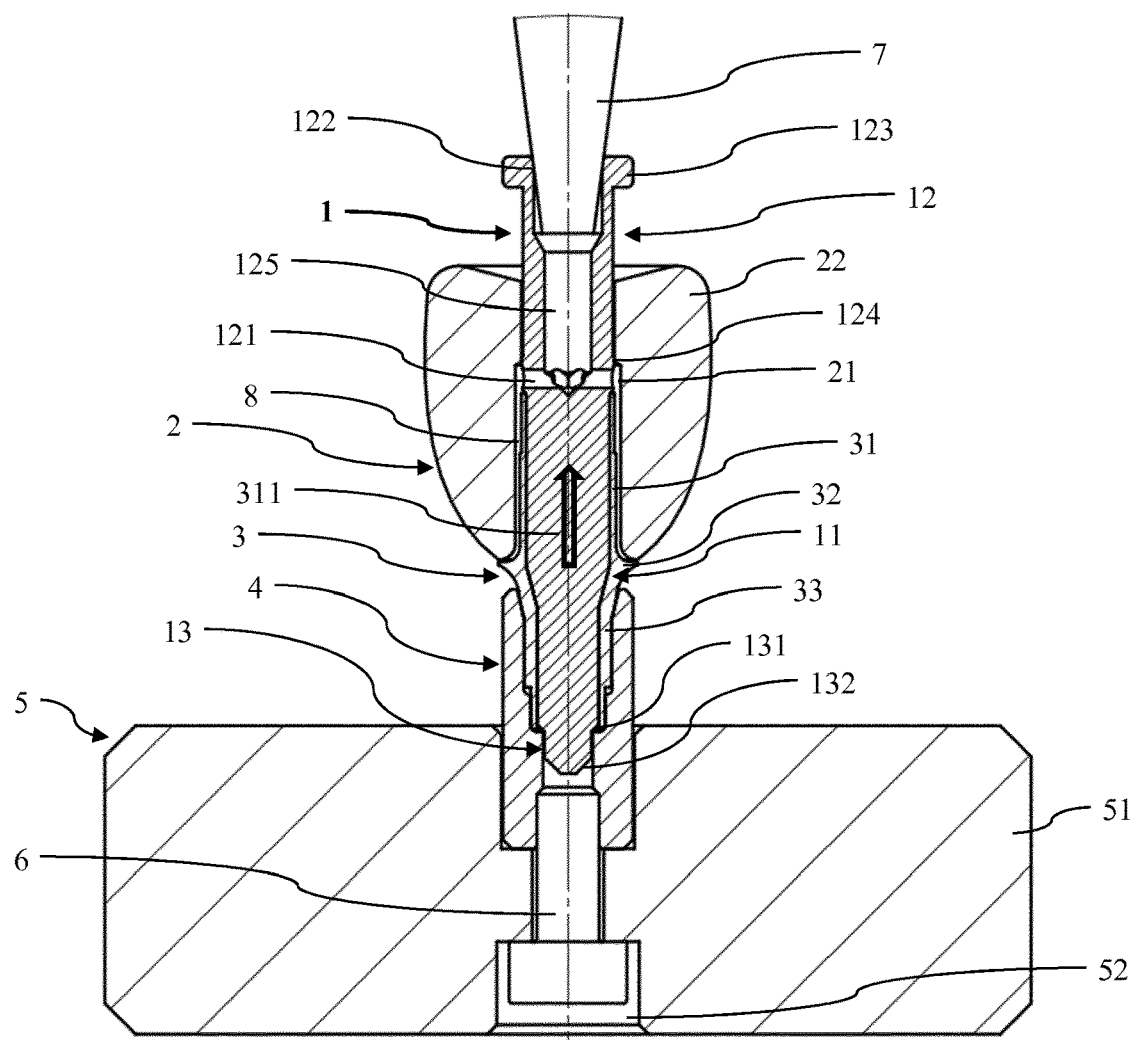
FIG. 6 shows of an embodiment of a dental restoration cementing assembly according to the invention comprising the dental restoration cementing device of FIG. 1.

FIG. 6 shows an embodiment of a dental restoration cementing assembly according to the invention. The assembly comprises the dental restoration cementing device 1, a dental crown 2 as a dental restoration, a titanium base 3, an implant analogue 4 and a carrier stand 5.

The titanium base 3 has a hollow interior which is open in an occlusal direction 311 as well as in an apical direction. Thus, it is sleeve like shaped. The base 3 further has a cylindrical pipe section 31 forming an apical end side of the base 3, a horizontal ground section 32 and an implant connecting section 33. The pipe section 31 and the ground section 32 are quasi cup shaped and together form a hollow interior which is open into an occlusal direction. The ground section 32 laterally projects besides the pipe section 31 and passes over into the implant connecting section 33 which has an outer shape suiting to an implant onto which the base is to be mounted. As also the implant analogue 4 is shaped in accordance with an upper portion of the implant to which the dental crown 2 is to be connected via the base 3, the implant connecting section 33 suits the implant analogue 4.

The implant analogue 4 is fixed to the carrier stand 5 by means of a screw 6 projecting through a through hole 52 provided in a plate 51 of the carrier stand 5. The plate 51 is laid on a surface such as, e.g., of a table such that the carrier stand 5 safely supports the implant analogue 4, the base 3 and the dental crown 2 as well as the dental restoration cementing device 1.

The dental crown 2 consists of a ceramic body 22 which is shaped in accordance with the tooth to be replaced. The base 3 and particularly its pipe section 31 vertically extends into a closable axial passage 21 provided through the body 22 of the dental crown 2. At its lower end the body 22 of the dental crown 2 neighbors the upper surface of the portion of the ground section 32 of the base 3 which laterally projects besides the pipe section 31.

At an upper end section of the cementing portion 12 of the dental restoration cementing device an adapter section 122 is provided. At the adapter section 122 a mixing cannula 7 as cement mixing arrangement enters top down into the hollow interior of the cementing portion 12. In particular, the cannula 7 has a conical tip which is pushed through an open end of the cementing portion 12 into the adapter section 122. The cannula 7 can provide a cement into the interior of the cementing reservoir 125 of the cementing portion 12. By providing a sufficient pressure, the cement may flow through the holes 121 into a gap 8 between the dental crown 2 and the base 3. Thus, the holes 121 establish a pathway from the interior of the cement reservoir 125 of the cementing portion 12 into the gap 8 between the dental crown 2 and the base 3. If a certain amount of cement is provided into the gap 8, it is laterally provided out of the gap 8 at its bottom end where it can be conveniently removed. Furthermore, the sealing bulge 124 tightens the passage 21 of the dental crown 2 such that it prevents the cement from flowing upwardly into a direction of a top end of the passage 21.

The post 13 extends through an opening in the bottom of the implant connecting section 33 and is press fitted into a recess bore of the implant analogue 4. Like this, the dental restoration cementing device 1 is fixed to the implant analogue 4. The plug portion 11 is dimensioned to tightly fit into the hollow interior of the base 3. In particular, due to the conical shape of its proximal end 111 and the elastic material it is made of the body portion 11 is pressed against an upper or occlusal edge of the pipe section 31 of the base 3. Thereby, the body portion 11 is slightly deformed or compressed such that it tightly closes the interior 31 of the base 3. Thereby, the holes 121 are located outside the base 2 just above the occlusal end of its pipe section 31.

For applying the dental restoration cementing device 1 for cementing the dental crown 2 on the base 3 in accordance with an embodiment of the method according to the invention, the dental crown 2 is placed onto the base 3 as shown in FIG. 6 such that the base 3 extends into the passage 21. The base 3 and the crown 2 are placed on the implant analogue 4 which is fixed to the stand 5 by the screw 6. The dental cementing device 1 is forwarded top down through the passage 21 of the crown 2 until the body portion 11 tightly fits into the interior 31 of the base 3. Thereby, the interior 31 of the base 3 is sealed by the body portion 11. The cementing portion 12 of the dental restoration cementing device 1 extends through the passage 21 of the dental crown 2.

Via the adapter section 122 the cannula 7 is mounted to the cementing portion 12 and the cement is pushed into the cement reservoir 125. By applying a suitable pressure the cement is forwarded out of the lateral holes 121 into the gap 8 between the dental crown 2 and the base 3. Thereby, the cement is uniformly distributed in the gap 8. As soon as cement is laterally exiting out of the gap 8 between the crown 2 and the base 3, the gap 8 is essentially completely filled with cement and the dental restoration cementing device 1 is removed from the dental crown 2. Superfluous cement laterally exiting between the crown 2 and the base 3 is removed and cleaned. Finally, the cement in the gap 8 between the dental crown 2 and the base 3 is cured such that the crown 2 and the base 3 are rigidly fixed together.

Figure 7:
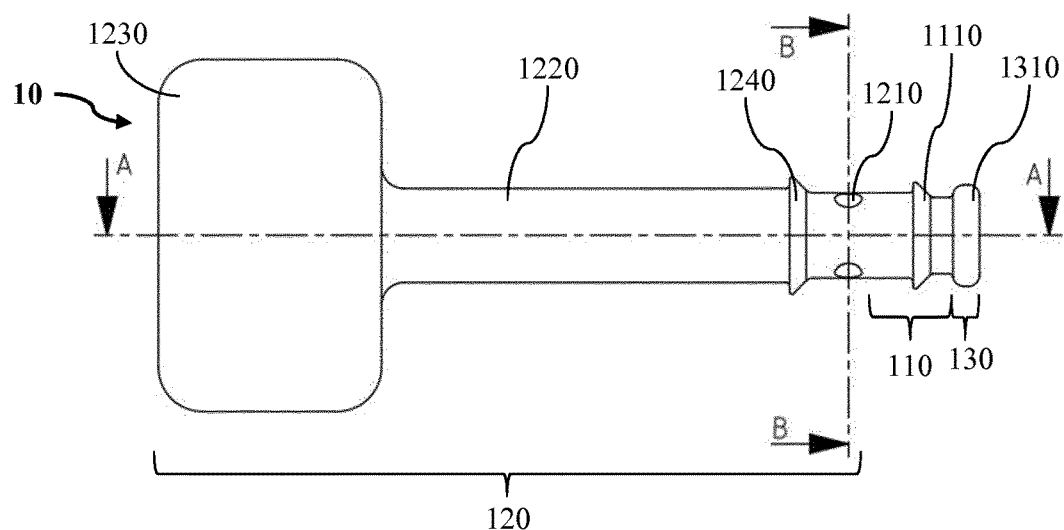
FIG. 7 shows a side view of a second embodiment of a dental restoration cementing device according to the invention.

FIG. 7 shows a second embodiment of a dental restoration cementing device 10 according to the invention. It comprises an essentially circular cylindrical body portion 110 equipped with a radially projecting base sealing bulge 1110. At its distal or axial end the body portion 110 passes over into a stamp-shaped plunger 130 as connection post of the dental restoration cementing device 10. The plunger has a diameter which is slightly smaller than a diameter of the base sealing bulge 1110.

The dental restoration cementing device 10 further comprises a hollow cementing portion 120 vertically or axially extending from an occlusal or proximal end of the body portion 110. The cementing portion 120 has a cylinder section 1220 equipped with a radially projecting crown sealing bulge 1240. A cylinder wall of the cementing portion 120 is provided with a lateral opening having a plurality of regularly and circumferentially positioned holes 1210. Axially, the holes 1210 are arranged adjacent to the proximal end of the body portion 110. Further, the cementing portion 12 has a gripping flange 1230 at its proximal end which forms the proximal end of the complete dental restoration cementing device 10. The body portion 110, the cementing portion 120 and the plunger 130 are integrally made of Polyoxymethylene (POM).

Figure 8:
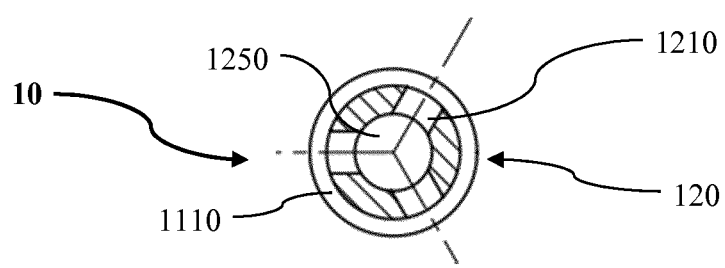
FIG. 8 shows a transversal cross sectional view of the dental restoration cementing device of FIG. 7 along the line B-B of FIG. 7.

In FIG. 8 the dental restoration cementing device 10 is shown in a transversal cross sectional view at the axial position of the holes 1210. Thereby, it can be seen that there are three holes 1210 each straightly extending from a center of the cementing portion 120 in a radial direction. The cementing portion 120 has a hollow interior forming a cement reservoir 1250. The three holes 1210 are outwardly and inwardly open such that the cement reservoir 1250 is connected to the outside of the dental restoration cementing device 10 via the holes 1210.

Figure 9:
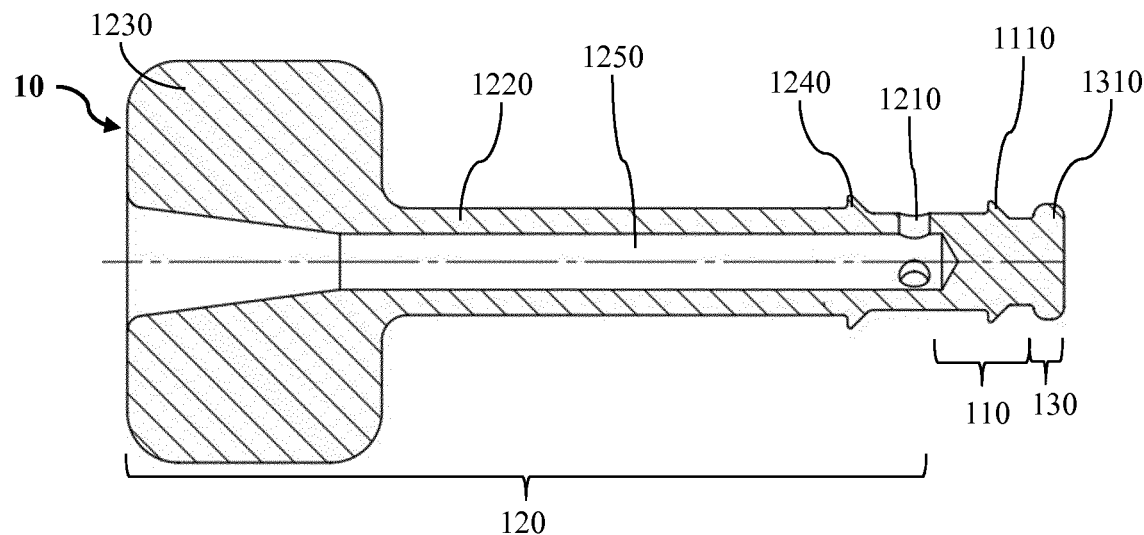
FIG. 9 shows an axial cross sectional view of the dental restoration cementing device of FIG. 7 along the line A-A of FIG. 7.

FIG. 9 shows the dental restoration cementing device 10 in an axial cross sectional view. Thereby, it can be seen that the cementing reservoir 1250 widens in the gripping flange 1230 of the cementing portion 120 for forming an adapter section to receive a mixing cannula as cement mixing arrangement. In particular, a conical tip of the mixing cannula may enter into the widening of the hollow interior of the cementing portion 120. Furthermore, whereas the cementing portion 120 has a hollow interior, the body portion 110 and the plunger 130 are solid.

In use, the dental restoration cementing device 10 is forwarded through a passage of a crown mounted on a base into the hollow interior of the base until the plunger abuts a ground of the base or a screw which fixes the base to a stand similarly as shown in FIG. 6 with respect to the first embodiment of the invention. The base sealing bulge 1110 of the body portion 110 tightly fits to the base such that the dental restoration cementing device 10 is received in the base in a seal manner. In this position, the holes 1210 of the cementing portion are either inside the base or outside but close to the base. The crown sealing bulge 1240 of the cementing portion 120 tightly fits to the crown. Thus, cement exiting the holes 1210 of the cementing portion 120 may travel inside the passage of the crown and the hollow interior of the base only between the base sealing bulge 1110 and the crown sealing bulge 1240. Like this, it can be prevented that the cement is provided to locations where it should not be and it can be made sure that most of the cement is provided between the crown and the base. Any cement remaining inside the base or the passage of the crown is removed by the base sealing bulge 1110 when withdrawing the dental restoration device 10.

This description and the accompanying drawings that illustrate aspects and embodiments of the present invention should not be taken as limiting-the claims defining the protected invention. In other words, while the invention has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the invention. Thus, it will be understood that changes and modifications may be made by those of ordinary skill within the scope and spirit of the following claims. In particular, the present invention covers further embodiments with any combination of features from different embodiments described above and below.

The disclosure also covers all further features shown in the Figs. individually although they may not have been described in the afore or following description. Also, single alternatives of the embodiments described in the figures and the description and single alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word "comprising" does not exclude other elements or steps, and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. The terms "essentially", "about", "approximately" and the like in connection with an attribute or a value particularly also define exactly the attribute or exactly the value, respectively. The term "about" in the context of a given numerate value or range refers to a value or range that is, e.g., within 20%, within 10%, within 5%, or within 2% of the given value or range. Components described as coupled or connected may be electrically or mechanically directly coupled, or they may be indirectly coupled via one or more intermediate components. Any reference signs in the claims should not be construed as limiting the scope.

The invention claimed is:

1. A dental restoration cementing device for cementing a dental restoration having a closable axial passage to a base having a hollow interior which is open into an occlusal direction, the dental restoration cementing device comprising:
    a body portion dimensioned to tightly fit into the hollow interior of the base via the closable axial passage of the dental restoration; and
    a hollow cementing portion extending from the body portion,
    wherein the hollow cementing portion has a lateral opening which is located outside the base when the body portion is fitted into the hollow interior of the base such that a pathway is formed from an interior of the hollow cementing portion through the lateral opening into a gap between the dental restoration and the base, and
    wherein a side wall of the interior of the hollow cementing portion comprises a mixing contour.

2. The dental restoration cementing device according to claim 1, wherein the lateral opening comprises a plurality of through holes or slits.

3. The dental restoration cementing device according to claim 1, wherein the body portion comprises a distal end with an analogue connection post.

4. The dental restoration cementing device according to claim 3, wherein the analogue connection post has a thread on an outer surface thereof.

5. The dental restoration cementing device according to claim 3, wherein the analogue connection post is dimensioned to be clamped in an opening of an associated analogue.

6. The dental restoration cementing device according to claim 1, wherein the mixing contour is essentially helical.

7. The dental restoration cementing device according to claim 1, wherein a proximal end of the hollow cementing portion comprises an adapter section for receiving a cement mixing arrangement.

8. The dental restoration cementing device according to claim 1, wherein the body portion and the hollow cementing portion are together formed as one piece and of the same material.

9. The dental restoration cementing device according to claim 1, wherein the hollow cementing portion comprises a sealing bulge around an outer circumference thereof.

10. A dental restoration cementing assembly comprising:
    a dental restoration with a closable axial passage;
    a base adapted to extend into the closable axial passage of the dental restoration and having a hollow interior opened into an occlusal direction; and
    a dental restoration cementing device that comprises
        a body portion dimensioned to tightly fit into the hollow interior of the base via the closable axial passage of the dental restoration, and
        a hollow cementing portion extending from the body portion,
    wherein the hollow cementing portion of the dental restoration cementing device has a lateral opening which is located outside the base when the body portion of the dental restoration cementing device is fitted into the hollow interior of the base such that a pathway is formed from an interior of the hollow cementing portion of the dental restoration cementing device through the lateral opening into a gap between the dental restoration and the base.

11. The dental restoration cementing assembly according to claim 10, further comprising an implant analogue adapted to receive the base and to be connected to the body portion of the dental restoration cementing device, wherein the base comprises an opening in an apical end side and the body portion is connected to the implant analogue through the opening of the base when being tightly fitted into the hollow interior of the base.

12. The dental restoration cementing assembly according to claim 11, further comprising a carrier stand onto which the implant analogue is mountable.

13. The dental restoration cementing assembly according to claim 12, wherein the implant analogue is adapted to be screwed onto the carrier stand.

14. A method of cementing a dental restoration to a base, comprising:
    obtaining a dental restoration having a closable axial passage and a base having a hollow interior which is open into an occlusal direction;
    placing the dental restoration onto the base such that the base extends into the closable axial passage of the dental restoration;
    tightly fitting a body portion of a dental restoration cementing device into the hollow interior of the base such that a hollow cementing portion of the dental restoration cementing device extends through the closable axial passage of the dental restoration, wherein the dental restoration cementing device comprises a body portion dimensioned to tightly fit into the hollow interior of the base via the closable axial passage of the dental restoration, and the hollow cementing portion extends from the body portion, and wherein the hollow cementing portion has a lateral opening which is located outside the base when the body portion is fitted into the hollow interior of the base such that a pathway is formed from an interior of the hollow cementing portion through the lateral opening into a gap between the dental restoration and the base;
    pushing a cement into the hollow cementing portion of the dental restoration cementing device such that the cement is provided out of the lateral opening of the hollow cementing portion of the dental restoration cementing device into the gap between the dental restoration and the base; and curing the cement in the gap between the dental restoration and the base.

* * * * *